United States Patent
Winmill et al.

(10) Patent No.: US 6,263,850 B1
(45) Date of Patent: Jul. 24, 2001

(54) INTEGRATED AIR INDUCTION MODULE FOR GASOLINE ENGINES

(75) Inventors: Peter John Winmill; Andrew John Murray; Chris Nigel Gibson, all of Essex; Dan Myers, Kent; John New, Bedworth; Russell Talbot, Essex, all of (GB)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/366,611

(22) Filed: Aug. 3, 1999

(51) Int. Cl.$^7$ .................................................. F02M 35/10
(52) U.S. Cl. ................................. 123/184.21; 123/198 E
(58) Field of Search ........................ 123/184.24, 184.34, 123/184.42, 184.47, 184.53, 184.55, 184.21, 198 E

(56) References Cited

U.S. PATENT DOCUMENTS

| | | | |
|---|---|---|---|
| 2,642,052 | 6/1953 | Wagner et al. ...................... | 123/119 |
| 4,726,329 | * 2/1988 | Atkin ...................................... | 123/52 |
| 4,919,086 | 4/1990 | Shillington ...................... | 123/52 MV |
| 5,003,933 | 4/1991 | Rush, II et al. ................. | 123/52 MC |
| 5,447,933 | 9/1995 | Kopec .............................. | 123/184.42 |
| 5,642,697 | 7/1997 | Jahrens et al. ................... | 123/184.21 |
| 5,664,533 | 9/1997 | Nakayama et al. ............. | 123/184.42 |
| 5,713,323 | 2/1998 | Walsh et al. ..................... | 123/184.42 |
| 5,715,782 | 2/1998 | Elder ............................... | 123/184.61 |
| 5,826,553 | 10/1998 | Nakayama et al. ............. | 123/184.42 |
| 5,924,399 | * 7/1999 | Koike et al. ..................... | 123/184.21 |
| 5,950,586 | 9/1999 | Ropertz .......................... | 123/184.42 |
| 6,067,953 | 5/2000 | Bloomer .......................... | 123/198 E |

FOREIGN PATENT DOCUMENTS

| | | | |
|---|---|---|---|
| 0523027-A2 | * 1/1993 | (EP) ................................. | 123/184.53 |
| 0803647 | 10/1997 | (EP) . | |
| 0892169 | 1/1999 | (EP) . | |
| 98/00638 | 1/1998 | (WO) . | |

* cited by examiner

*Primary Examiner*—Tony M. Argenbright
*Assistant Examiner*—Katrina B. Harris
(74) *Attorney, Agent, or Firm*—John E. Kajander

(57) ABSTRACT

An integrated intake module (10; 100; 200) for an internal combustion engine (22) has an air box (14) that encloses an internal space and contains a particulate filter (24) that separates a clean air space (26) from a dirty air space (28). A throttle body assembly (16) receives clean air from the air box and delivers the air to a plenum (18). Runners (20) that have respective inlets at which clean air from the plenum enters extend lengthwise to respective outlets for delivering clean air to cylinders of the engine. At least a portion of the length of each runner is disposed on the air box wall about the dirty air space.

17 Claims, 7 Drawing Sheets

INTEGRATED AIR INDUCTION MODULE FOR GASOLINE ENGINES

BACKGROUND OF THE INVENTION

1. Field of the Invention

This invention relates generally to internal combustion engines, and more specifically to an integrated air induction module for a gasoline engine.

2. Background Information

Spark-ignited, fuel-injected internal combustion engines enjoy extensive usage as the powerplants of automotive vehicles. In a representative piston engine, an intake manifold conveys intake air to intake valves of engine combustion cylinders. The intake valves are normally closed but open at certain times during the operating cycle of each cylinder. Pistons that reciprocate within the engine cylinders are coupled by connecting rods to a crankshaft. When the normally closed intake valves open, fuel, such as gasoline, is sprayed by electric-operated fuel injectors into intake air entering the cylinders, creating charges of combustion gases that pass through the open intake valves and into the combustion cylinders. After the intake valves close, the charges are compressed by the pistons during compression strokes and then ignited by electric sparks at the beginning of power strokes to thereby drive the pistons and power the engine.

Various air intake arrangements are documented in patent literature. A known air intake system for an engine comprises a succession of components that run in series, beginning at a dirty air inlet, and ending at the engine. Dirty air is conveyed through a dirty air duct to an air box. A particulate filter within the air box filters certain particulate material from the intake air flow so that clean air emerges from the air box. That clean air passes through a throttle that operates to selectively restrict the flow. From there the flow passes to a plenum, and thence through individual tracts, or runners, leading to the individual engine cylinders.

Developments in materials and processes have enabled various parts of engine air intake systems to be fabricated in ways that significantly differ from metal casting and machining methods that have been used in the past. The ability to fabricate intake system parts using newer processes and materials offers a number of benefits, including for example and without limitation: opportunities to structure intake systems in novel configurations for design and/or functional purposes; realization of fabrication and assembly cost savings; shorter lead times from design to production; and more efficient use of engine compartment space in an automotive vehicle. Productivity improvements in the manufacture of engine air intake systems may be attained through increased integration of individual component parts. A total integration of individual components would provide an intake system module that could be tested by itself before assembly to an engine, and then assembled as a unit to the engine. Fabrication and testing of modules could be performed by a supplier before shipment to an engine assembly plant, or a motor vehicle assembly plant, where modules would be assembled directly to engines. Even if it were not feasible to fabricate a total module, the integration of a substantial number of its constituents would be advantageous.

There are different configurations for injecting fuel into gasoline engines. In a port-injected engine, fuel injectors are disposed relatively more inclined to the length of a cylinder, generally to the side of the cylinder. In a direct-injection engine, fuel injectors are disposed relatively less inclined and poised at the top of a cylinder. Accordingly, different considerations are apt to be present of the design of intake systems for the respective engine configurations.

An example of a known module appears in U.S. Pat. No. 5,713,323 assigned at issue to Ford Motor Company. A commonly owned patent application Ser. No. 09/329,724, filed Jun. 10, 1999 also relates to an integrated air induction module for gasoline engines.

SUMMARY OF THE INVENTION

The present invention relates to an engine air intake module that comprises a novel integration of components, and two embodiments of the module are illustrated in the drawings. The inventive module is especially adapted for a direct-injected gasoline engine, although the inventive principles are not necessarily so limited in their application.

Certain aspects of the invention arise through the recognition that the placement of fuel injector inlet ports in a direct-injection gasoline engine makes available certain space that might not otherwise be available in a port-injection engine. The inventive module efficiently utilizes that space. The efficient space utilization is believed to provide not only certain dimensional compactness, but also certain functional improvements that will be described in detail later.

A general aspect of the within claimed invention relates to an engine air intake module comprising: an air box that contains a particulate filter separating a clean air space from a dirty air space; a dirty air inlet for delivering dirty air to the dirty air space; a clean air outlet for delivering clean air from the clean air space; a throttle body assembly comprising an inlet into which clean air from the clean air outlet enters and an outlet from which clean air exits; a plenum comprising an inlet through which clean air from the throttle body assembly outlet enters a plenum space; and runners that have respective inlets through which clean air from the plenum space enters and that have respective lengths running from the respective inlets to respective outlets for delivering clean air to respective cylinders of an engine; in which the air box comprises a dirty air space wall that bounds a lengthwise extent of the dirty air space; the plenum has a lengthwise extent that is adjacent the lengthwise extent of the dirty air space wall; and at least a portion of the length of a respective runner is disposed on a respective portion of the dirty air space wall.

Another general aspect relates to a direct-injected gasoline engine comprising: a bank of engine cylinders into which gasoline is direct injected; and an engine air intake module disposed alongside the cylinder bank for delivering combustion air to the cylinders; the module comprising an air box having a wall that runs lengthwise alongside the cylinder bank and encloses an internal space; a particulate filter disposed within the internal space to separate a clean air space from a dirty air space; a dirty air inlet for delivering dirty air to the dirty air space; a clean air outlet for delivering clean air from the clean air space; a throttle body assembly comprising an inlet into which clean air from the clean air outlet enters and an outlet from which clean air exits; a plenum comprising plenum space that runs lengthwise of, and in underlying relationship to, the air box and an inlet at which clean air from the throttle body assembly outlet enters the plenum space; and runners that are disposed in succession along the length of the air box, that have respective inlets through which clean air from the plenum space enters, and that have respective lengths running from the respective inlets to respective outlets for delivering clean air to respective cylinders of the engine; and at least a portion of the length of each runner is disposed on a respective portion of the dirty air space wall.

Still another general aspect relates to an engine air intake module comprising: an air box comprising first and second walled parts enclosing an interior that contains a particulate filter through which air flow through the air box is constrained to pass, thereby separating a clean air space from a dirty air space; the first and second walled parts comprising respective closed perimeters which bound respective openings of the respective parts and form a joint at which the parts fit together; one of the parts comprising a divider wall that divides an interior volume of the one part into a portion of one of the air spaces and a portion of the other of the air spaces, including dividing the opening of the one part into two respective open areas each bounded by its own closed perimeter; the other part comprising an interior volume and a divider that divides the opening of the other part into two respective open areas each bounded by its own closed perimeter; an element captured between the first and second walled parts comprising a closed perimeter frame captured between the closed perimeter frames of the parts to make the joint between the parts air-tight; the element comprising a divider that divides the frame into two respective open areas each bounded by its own closed perimeter and that is captured between the divider of the other part and the divider wall of the one part such that a first of the open areas of the one part, of the other part, and of the element are disposed in mutual registration, and a second of the open areas of the one part, of the other part, and of the element are disposed in mutual registration, with the closed perimeter bounding the first open area of the element being captured between the closed perimeter frames bounding the first open areas of the first and second parts to make an air-tight joint between them, and with the closed perimeter bounding the second open area of the element being captured between the closed perimeter frames bounding the second open areas of the first and second parts to make an air-tight joint between them; and one of the open areas of the element containing the particulate filter.

Other general and more specific aspects will be set forth in the ensuing description and claims.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT

Figure 1:
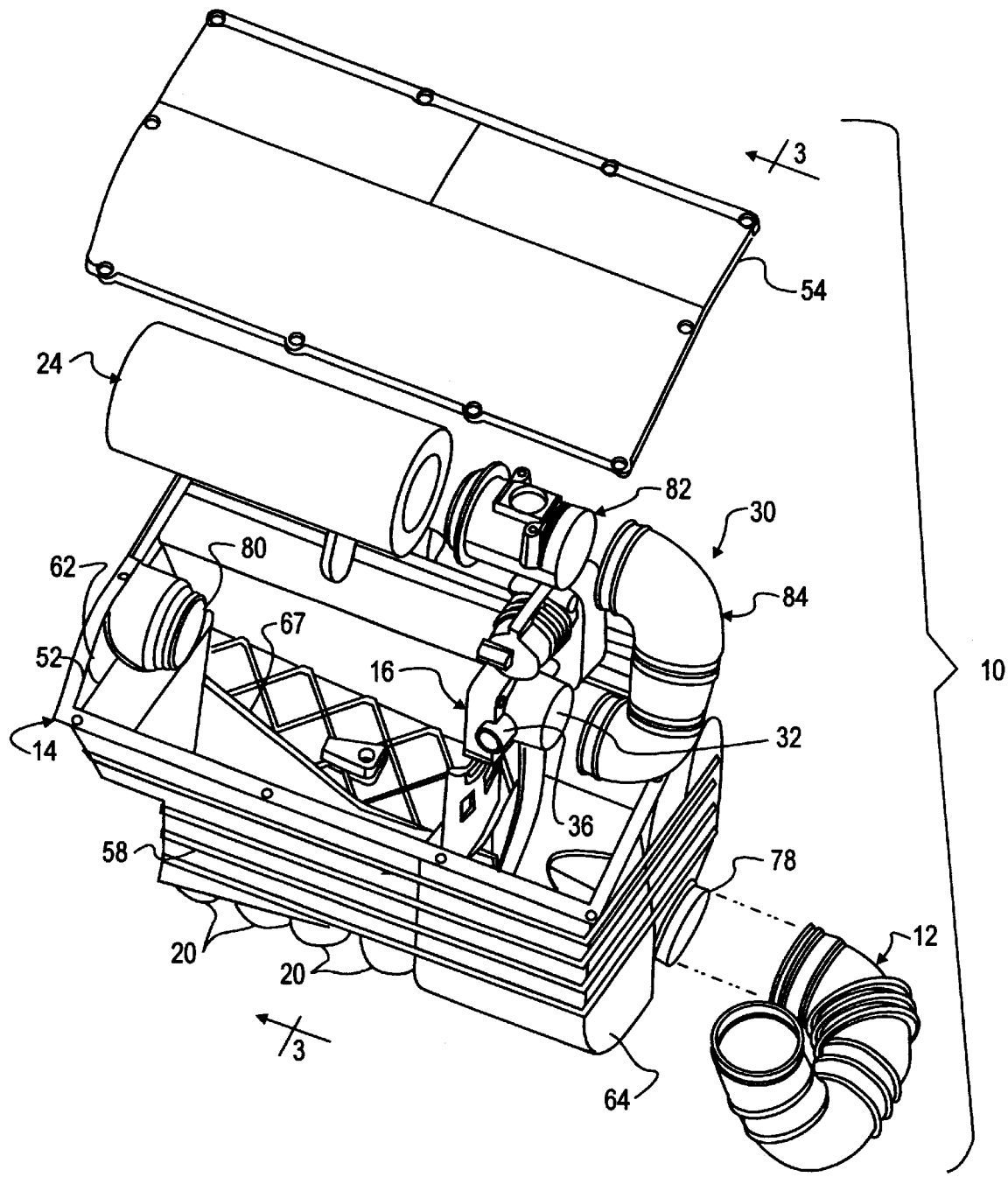
FIG. 1 is an exploded isometric view of a first embodiment of air intake module for an internal combustion engine embodying principles of the present invention.
Figure 2:
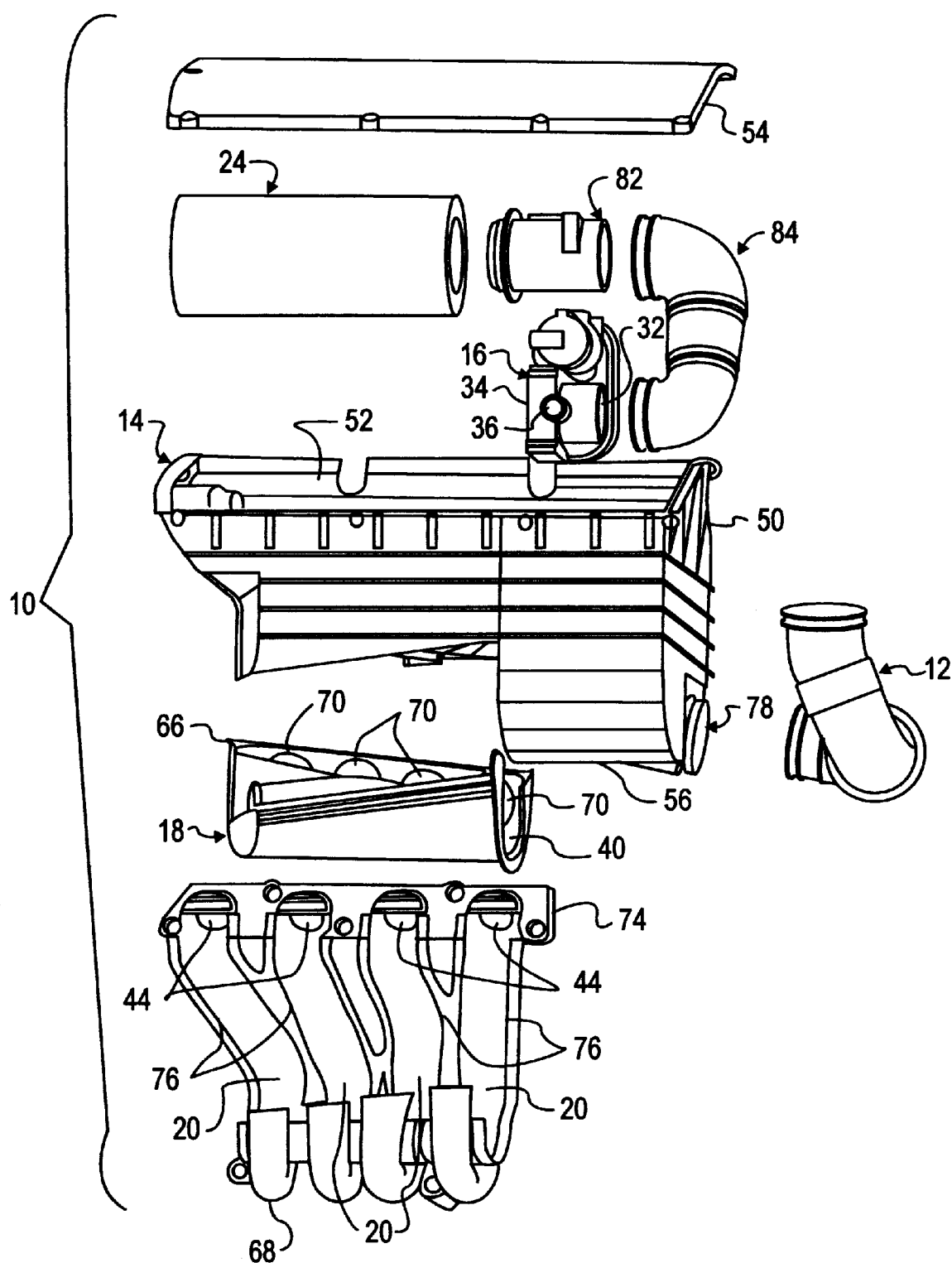
FIG. 2 is an exploded side elevation view of the module.
Figure 3:
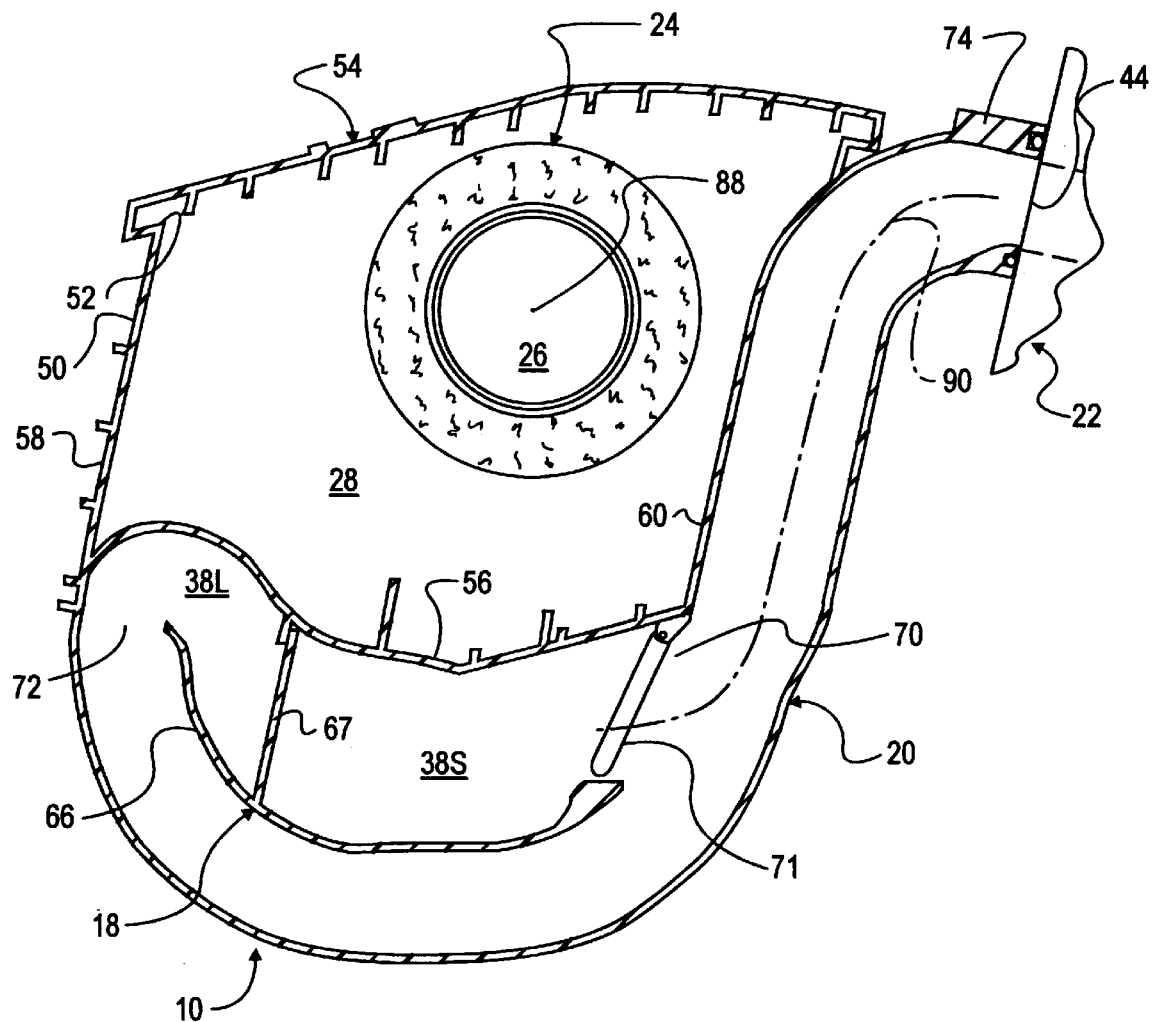
FIG. 3 is an enlarged transverse cross section view through the module, generally along line 3—3 in FIG. 1.

FIGS. 1–3 show an air intake module 10 that comprises a dirty air inlet 12, an air box 14, a throttle body assembly 16, a plenum 18 comprising first and second plenum spaces 38L, 38S, and runners, or tracts, 20, in that order, along an air intake path to cylinders of an internal combustion engine 22. Engine 22 is a direct-injected gasoline engine with a vertical intake port, and module 10 is disposed to one side of a cylinder bank of engine 22 such that the long dimension of the module runs parallel to the centerline of the engine.

Air box 14 encloses an internal space and contains a tubular particulate filter 24 that separates a clean air space 26 from a dirty air space 28. Dirty air inlet 12 delivers dirty air to dirty air space 28. A clean air outlet 30 delivers clean air from clean air space 26.

Throttle body assembly 16 comprises an inlet 32 at which clean air from clean air outlet 30 enters and an outlet 34 at which clean air exits. Throttle body assembly 16 further comprises a mechanism 36 for selectively restricting the clean air flow passing from inlet 32 to outlet 34, and may further include an internal by-pass for supplying idle air flow to engine 22 through an idle air control valve (not shown).

Plenum 18 comprises an inlet 40 at which clean air from throttle body outlet 34 can enter plenum spaces 38L, 38S. A rudder plate (not shown) is selectively positionable to a first position for preferentially directing air into plenum space 38L and to a second position for preferentially directing air into plenum space 38S.

As will be described more fully at a later point in the text, each runner 20 has a respective pair of inlets at which clean air from the respective plenum spaces can enter, and from which each runner extends lengthwise to a respective outlet 44 at which clean air is delivered to an intake of a respective engine cylinder that includes one or more intake valves (not shown).

Air intake module 10 is fabricated from multiple parts assembled together. Air box 14 comprises a walled part 50 having an open top 52 that is closed by a removable cover 54. The perimeters of open top 52 and cover 54 fit together in air-tight fashion, with cover 54 removably attaching to part 50 by any suitable means such as releasable clasps or catches. Part 50 has a bottom wall 56, lengthwise extending side walls 58, 60, and transverse end walls 62, 64 at lengthwise ends. FIG. 2 shows that bottom wall 56 and side walls 58, 60 are stepped at approximately one-third of the overall length of part 50 from end wall 64.

Two further parts 66, 68 cooperatively associate with part 50 to complete the definition of dirty air space 28, the plenum spaces, and runners 20. Part 66 fits to part 50 to the left of the step in the latter part, with the two parts cooperatively defining plenum spaces. Part 66 has a division wall 67 that divides plenum 18 into plenum spaces 38L and 38S. Part 66 contains four holes 70 that are open to plenum space 38S, but that can be selectively closed in unison by a respective obturator 71 associated with the selected hole. Part 66 also contains four holes 72 that are open to plenum space 38L. The length of each runner from its hole 70 to its outlet 44 defines a short runner, and the length of each runner from its hole 72 to its outlet 44 defines a long runner. Each hole 70 defines the inlet for the short runner length, and hole 72, the inlet for the long runner length.

Part 68 comprises a flange 74 containing runner outlets 44 and partial tubes 76 that cooperate with parts 50 and 66 to form runners 20. A short length of each partial tube 76 immediately adjoining flange 74 is fully tubular, but beyond each short length, each partial tube 76 is approximately semi-circular, or D-shaped in transverse cross section. Each semi-circular, or D-shaped, portion closes against the exterior surface of side wall 60, and against the exterior surface of part 66 over a corresponding hole 70. Beyond each hole 70, each semi-circular, or D-shaped, runner portion closes against the exterior surface of part 66, continuing far enough to cover the corresponding hole 72.

Dirty air inlet 12 comprises a duct, one end of which fits to a collared hole 78 located in end wall 64 just above bottom wall 56. Thus, dirty air is introduced into the portion of air box 14 containing the stepped-down portion of bottom wall 56. The ends of the two plenum spaces 38S, 38L are closed at the step in the air box, but above the step, the interior of the air box is open in both lengthwise directions.

Near its top, end wall 62 is formed with an inwardly protruding hub 80. Filter 24 comprises a tubular filter cartridge, one end of which seats to hub 80 in air-tight fashion. The opposite end of the cartridge has an air-tight fit to one end of an airflow meter 82 whose opposite end fits to one end of a reversing tube 84. The opposite end of tube 84 fits to throttle body assembly inlet 32. Throttle body assembly outlet 34 is open to both plenum spaces, with the aforementioned rudder plate serving to preferentially direct the air flow to a particular one of the two spaces depending on its position. Thus, filter 24, airflow meter 82, reversing tube 84, and throttle body assembly 16 are disposed within the interior of the air box, with filter 24 separating clean air space from dirty air space, and with airflow meter 82 and reversing tube 84 forming a continuation of the clean air space leading to throttle body assembly 16.

When engine 22 operates, dirty air is drawn into the dirty air space through inlet 12. Air flows radially through filter 24 from the exterior cylindrical surface of the cartridge which faces the dirty air space to the cartridge interior cylindrical surface which surrounds the beginning of the clean air space.

The clean air space continues through airflow meter 82, reversing tube 84, and throttle body assembly 16 to enter plenum spaces 38S, 38L. Runners 20 convey clean air from the plenum spaces to the engine cylinders. When obturators 71 are closing holes 70, the rudder plate directs the flow from the throttle to plenum space 38L, making the runners function as long runners. When obturators 71 are not closing holes 70, the rudder plate directs the flow from the throttle to plenum space 38S, and the runners function as short runners.

Plenum 18 is disposed in underlying relationship to bottom wall 56 of dirty air space 28, and, from each respective runner inlet at a hole 70, each runner runs generally upward along a respective portion of the side wall of the dirty air space on the exterior surface of side wall 60. Within the air box, filter 24 is surrounded by dirty air space 28 about its full circumference, and the filter itself circumferentially surrounds a beginning of clean air space 26. The clean air space continues, from this beginning, along a passage that comprises a reverse bend to the throttle body assembly inlet.

The tubular filter cartridge 24 has an imaginary straight centerline 88 running along its length, and each runner 20 has a respective imaginary curved centerline 90 running along its length. In an imaginary vertical plane passing through each centerline 90 at the respective runner outlet 44, the entirety of the runner outlet is disposed at a vertical elevation higher than that of cartridge centerline 88. Stated another way, it may be said that each respective imaginary vertical plane that passes through a respective runner centerline at the respective runner outlet intersects the centerline of the tubular filter at a vertical elevation below that of the respective runner centerline at the respective runner outlet.

Parts 50, 66, 68 are preferably fabricated from plastics materials known to be suitable for engine air intake systems for using known plastic fabrication technology. Individual parts may be joined along mating perimeter margins by known plastic joining methods to create fluid-tight joints.

Figure 4:
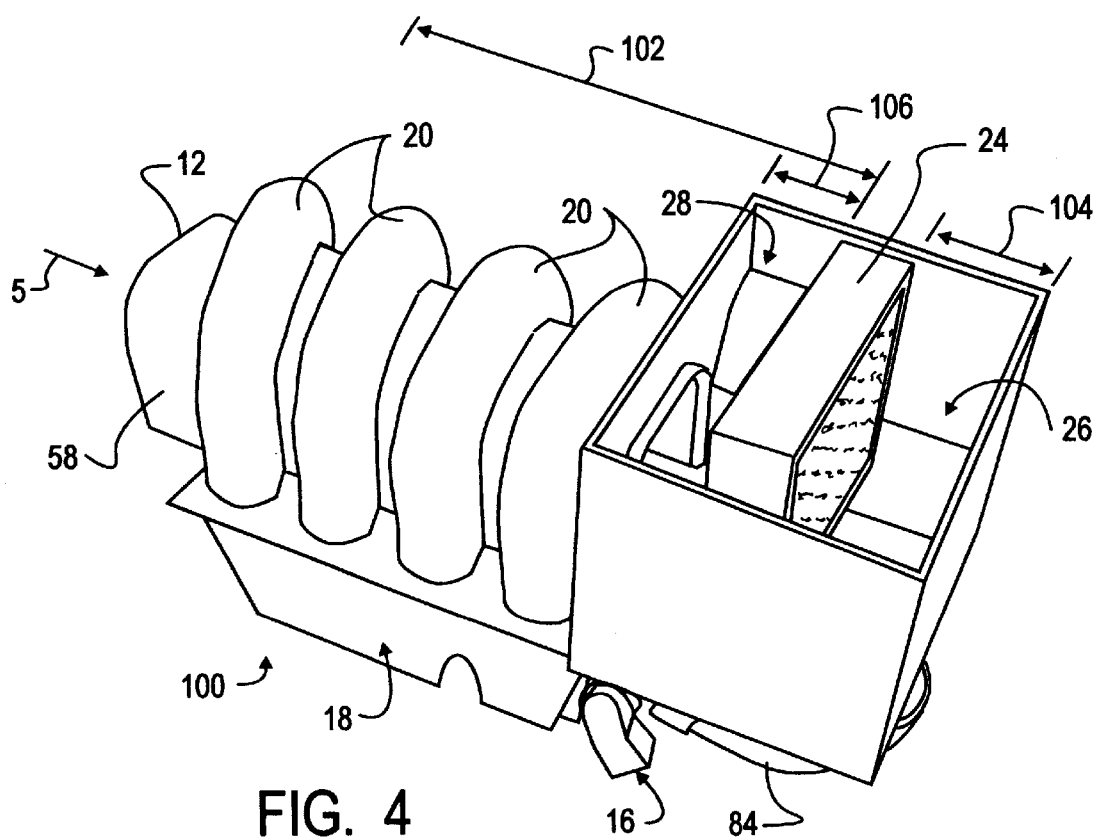
FIG. 4 is a perspective view of a portion of a second embodiment of air intake module.
Figure 5:
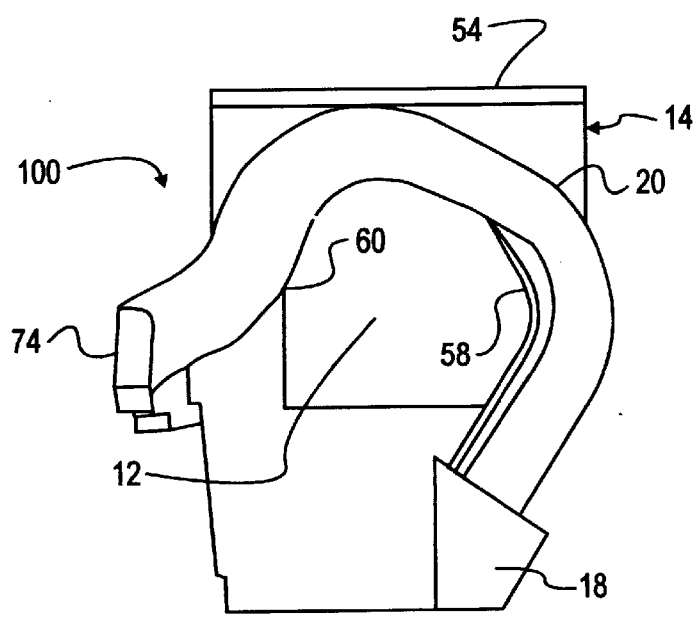
FIG. 5 is an end view in the general direction of arrow 5 in FIG. 4, with a portion broken away for illustrative purposes.

FIGS. 4 and 5 show a second module embodiment 100. The same reference numerals that were used in FIGS. 1–3 are used in FIGS. 4 and 5 to identify the same components. Hence, the description of FIGS. 1–3 given above applies to embodiment 100 without repetition, and the latter embodiment will be described to the extent of explaining significant differences between it and module 10.

In module 100, dirty air enters at an end of the air box containing inlet 12. Runners 20 are still disposed on the exterior surface of the air box wall, but run upward from plenum 18 along side wall 58, thence across the top wall, and thence part way down side wall 60 where they curve into flange 74. The portion of the length of the air box wall that is marked by the arrow 106 bounds the dirty air space 28. Filter 24 is now a rectangular cartridge, disposed transversely across the interior of the air box, separating dirty air space 28 from clean air space 26, the latter being marked by the arrow 104.

Figure 6:
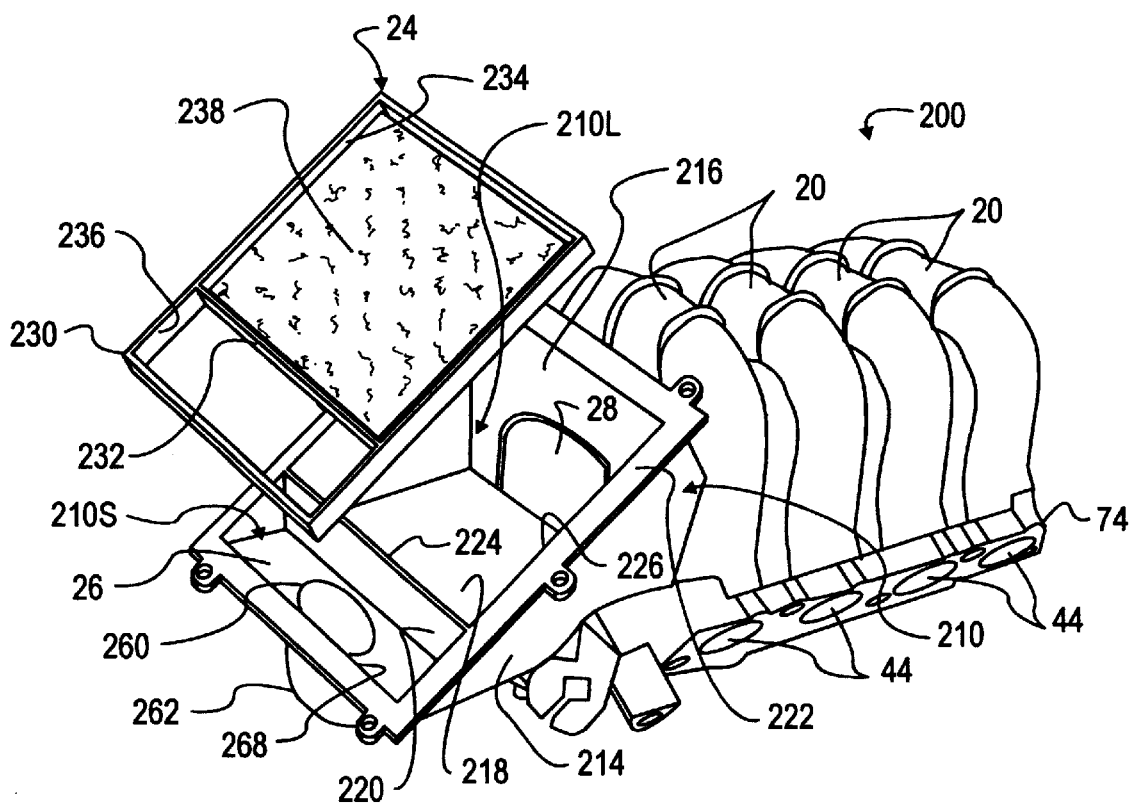
FIG. 6 is a perspective view from one direction of a portion of a third embodiment, a portion of which has been exploded for illustrative purposes.
Figure 7:
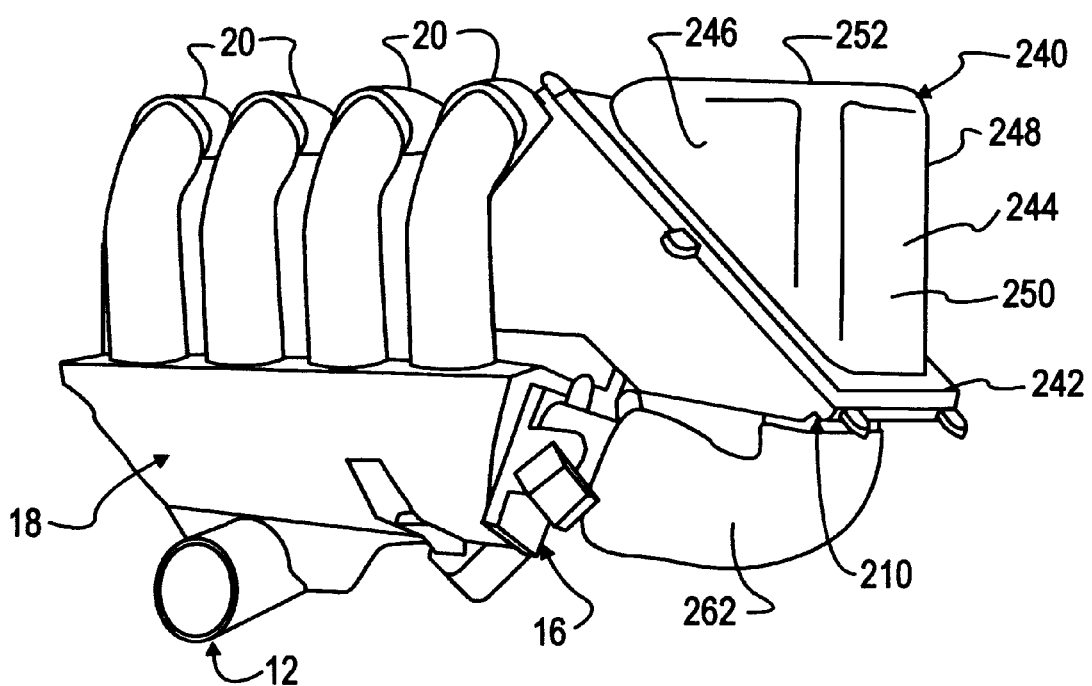
FIG. 7 is a perspective view of the third embodiment from a different direction.
Figure 8:
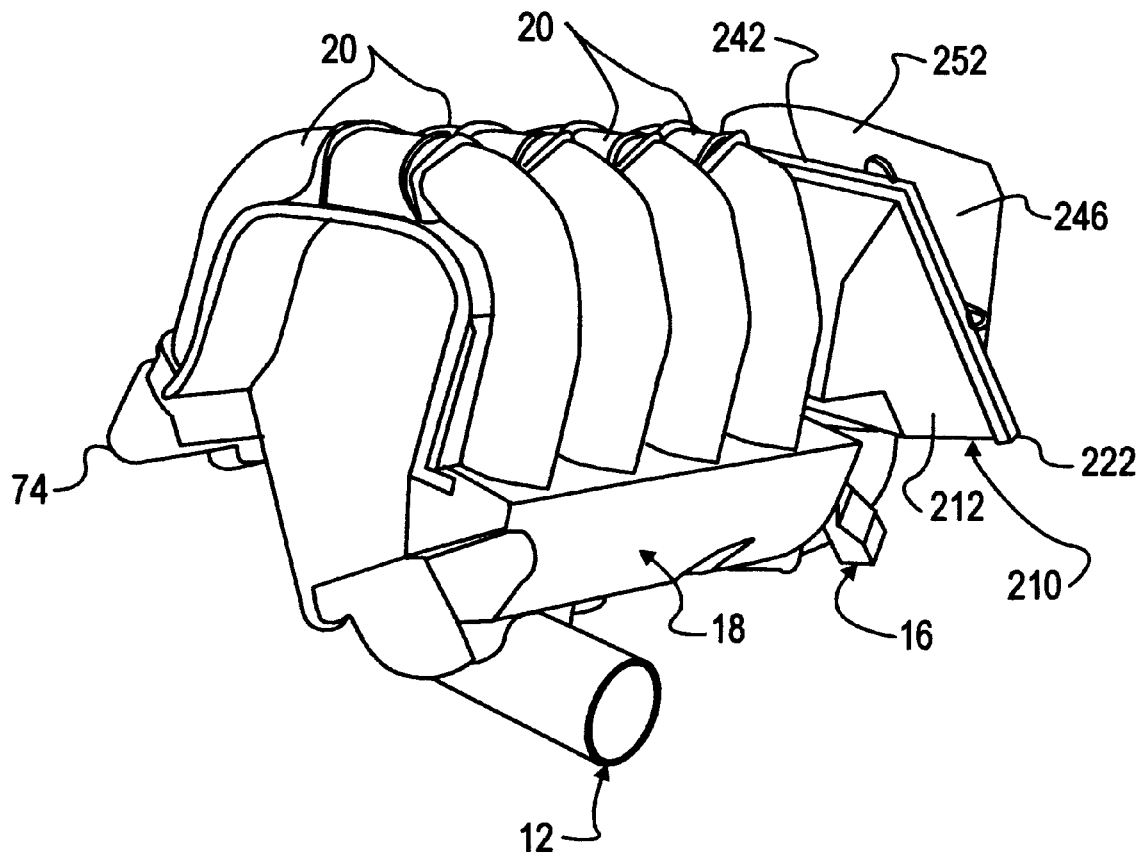
FIG. 8 is a perspective view of the third embodiment from yet a different direction.

Hence, filter 24 comprises a filtering area disposed transversely across a lengthwise end of the dirty air space wall, and the clean air space comprises a clean air space wall forming a lengthwise extending continuation of the dirty air space wall. For accommodating the rectangular filter 24, the right hand end of the air box wall has a rectangular shape. Runners 20 are spaced from filter 24 along the dirty air space wall by a portion 102 of the dirty air space wall that is immediately adjacent filter 24 and that has a rectangular transverse cross section. The clean air space wall that is immediately adjacent filter 24 also has rectangular transverse cross section, and the rectangular-shaped filtering area registers with those rectangular transverse cross sections of the immediately adjacent portions of the dirty air space wall and the clean air space wall. Cover 54 (see FIG. 5) covers the open rectangular top at the right hand end of the module as viewed in FIG. 4, and is removable to provide access to filter 24. FIGS. 6–8 disclose another embodiment of intake air module 200 that contains components similar to those of module 100 in FIGS. 4 and 5. Those similar components are marked in FIGS. 6–8 by the same reference numerals as in FIGS. 4 and 5. While the general arrangement of tracts 20 about the air box are similar, and while the filter cartridge is disposed in a portion of the air box that is disposed beyond the tracts in a direction that runs parallel to the engine centerline, there are several differences between the two modules 100, 200 that bear discussion.

In module 100, dirty air enters at an end of the air box. In module 200, it enters at the bottom. The dirty air may enter the air box through a tube (not shown) that runs to any appropriate location in the vehicle where suitable intake air is freely available. Tracts 20 are disposed on the exterior surface of the air box wall, running upward from plenum 18 along side wall 58, thence across the top wall, and thence part way down side wall 60 where they curve into flange 74. The portion of the air box that is disposed beyond tracts 20 at one lengthwise end of the module comprises a walled structure 210 that is a lengthwise extension of, and is integrally formed with, the wall on the exterior of which tracts 20 are disposed. Walled structure 210 has two generally triangular-shaped side wall sections 212, 214 that are disposed generally vertical and parallel with each other across the width of interior space of walled structure 210. A generally vertical transverse wall section 216 bridges the two wall sections 212, 214 where wall structure 210 emerges from the last tract 20. A generally horizontal floor 218 bridges lower edges of the side wall sections 212, 214 where wall structure 210 emerges from the last tract 20. Floor 218 runs lengthwise for the full extent of side wall sections 212, 214.

The side wall sections 212, 214 progressively decrease in height lengthwise of the module in the direction away from the last tract 20. At a location along the length of the air box where the side wall sections still have some height, a short vertical divider wall 220 is disposed upright on floor 218. It runs transversely, bridging side wall sections 212, 214 for essentially their full height at that location. Collectively, side wall sections 212, 214, vertical wall section 216, and floor 218 form a closed perimeter 222 that is disposed in essentially a flat plane that is non-perpendicular and non-parallel to the length of the air box. Such a plane may be considered skewed to the length of the air box, but only about one axis. Closed perimeter 222 has a rectangular shape. It is divided by a perimeter edge 224 of divider wall 220 into two side-by-side rectangular openings 226, 228.

Divider wall 220 also divides the interior of walled structure 210 in two, one portion being a larger volume 210L that is to the side of wall 220 that faces tracts 20 and contains opening 226, and the other portion being a smaller volume 210S that is toward the other side of wall 220 and contains opening 228.

Filter cartridge 24 of module 200 differs from its counterpart in module 100. It comprises a closed perimeter rectangular frame 230 that is congruent with closed perimeter 222. The frame further comprises a divider 232 that extends between the longer frame sides parallel with the shorter frame sides. Divider 232 is located to divide the frame into two side-by-side rectangular zones 234, 236 which are intended for respective registrations with respective openings 226, 228. A particular filter medium 238 fills zone 234 while zone 236 remains open.

Module 200 further comprises a lid 240 that closes the end of the air box. Lid 240 has a closed rectangular perimeter 242 that bounds an opening to an interior volume of lid 240 contained within a closed walled structure 244. Perimeter 242 is congruent with closed perimeter 222, and a divider slat spans perimeter 242 between its long sides to divide the opening into two rectangular areas. Walled structure 244 comprises generally triangular side walls 246, 248, a generally vertical end wall 250, and a generally horizontal top wall 252.

The closed perimeter filter frame 230 is captured between closed perimeters 222 and 242 when lid 240 is closing the air box, and it provides an air-tight seal between the two. Divider 232 is captured between the edge of divider wall 220 and the divider slat of lid 240. Accordingly, filter medium 238 is disposed in covering relation to opening 226 with air-tight sealing around the opening. As dirty air flows through volume 210L, it is filtered as it exits through opening 226 into the interior of lid 240. Hence the interior of lid 240 contains the beginning of the clean air space. Clean air can flow out of the interior of lid 240 into the smaller volume 210S. The portion of the perimeter frame that surrounds the open area of the filter cartridge seals between the interior of lid 240 and volume 210S.

Floor 218 contains an entrance of a walled tube 260 that is formed integrally with the floor so as to be open to volume 210S. Tube has a free end to which one end of a clean air hose, or duct, 262 is fit. The opposite end fits to the inlet of the throttle body assembly that in turn leads to the plenum that is disposed parallel to the portion of dirty air space surrounded by tracts 20 to deliver clean air to the tracts.

In the disclosed embodiments, the dirty air space provides a relatively large and uncluttered volume through which combustion intake air can pass. Moreover, the placement of the runners around the exterior of the air box creates a beneficial structural stiffening of the overall module, and may avoid need to incorporate additional features devoted exclusively to stiffening of the air box structure. It is believed that these attributes of the disclosed modules is conducive to favorable NVH (noise, vibration, harshness) characteristics and may eliminate a need for the association of one or more resonators with the module. In module 10, the use of a tubular filter and its relatively central placement are believed to provide better airflow characteristics. Access to filters is convenient, and the top cover may be designed to include styling features, if desired. The module can be fastened to an engine near the top, facilitating assembly to, and if needed, disassembly from an engine. Because certain components, such as the airflow meter and throttle body assembly are disposed, either in whole, or in substantial part within the airbox, they may be afforded some degree of protection. Certain cost-efficiencies may also accrue through the integration of parts, and attendant reduction in the number of assembly steps.

While a presently preferred embodiment has been illustrated and described, it is to be appreciated that the invention may be practiced in various forms within the scope of the following claims.

What is claimed is:

1. An engine air intake module comprising:

an air box that contains a particulate filter separating a clean air space from a dirty air space;

a dirty air inlet for delivering dirty air to the dirty air space;

a clean air outlet for delivering clean air from the clean air space;

a throttle body assembly comprising an inlet into which clean air from the clean air outlet enters and an outlet from which clean air exits;

a plenum comprising an inlet through which clean air from the throttle body assembly outlet enters a plenum space; and runners that have respective inlets through which clean air from the plenum space enters and that have respective lengths running from the respective inlets to respective outlets for delivering clean air to respective cylinders of an engine;

in which the air box comprises a dirty air space wall that bounds a lengthwise extent of the dirty air space;

the plenum has a lengthwise extent that is adjacent the lengthwise extent of the dirty air space wall; and at least a portion of the length of a respective runner is disposed on a respective portion of the dirty air space wall;

wherein the dirty air space wall comprises a top, a bottom spaced below the top, and laterally spaced apart sides extending between the top and bottom, the plenum is disposed in underlying relationship to the bottom of the dirty air space wall, and, from the respective runner inlet, each runner is disposed on a respective portion of a side of the dirty air space wall, running upward in the direction of the respective runner outlet.

2. An engine air intake module as set forth in claim 1 in which the particulate filter comprises a tubular filter cartridge disposed lengthwise within, and along the length of, the dirty air space so as to be surrounded about its full circumference by the dirty air space and to itself circumferentially surround a beginning of the clean air space.

3. An engine air intake module as set forth in claim 2 in which the clean air space continues, from its beginning, along a passage that comprises a reverse bend to the throttle body assembly inlet.

4. An engine air intake module as set forth in claim 2 in which the tubular filter cartridge comprises an imaginary centerline, and the entirety of each runner outlet is disposed at a vertical elevation higher than that of the cartridge centerline.

5. An engine air intake module as set forth in claim 2 in which the filter comprises a filtering area disposed transversely across a lengthwise end of the dirty air space wall, and the clean air space comprises a clean air space wall forming a lengthwise extending continuation of the dirty air space wall.

6. An engine air intake module as set forth in claim 5 in which the runners are spaced from the filter along the dirty air space wall by a portion of the dirty air space wall that is immediately adjacent the filter and that has a rectangular transverse cross section, a portion of the clean air space wall that is immediately adjacent the filter also has rectangular transverse cross section, and the filtering area of the filter has a rectangular shape registering with the rectangular transverse cross sections of the immediately adjacent portions of the dirty air space wall and the clean air space wall.

7. An engine air intake module comprising:
a walled air box comprising a dirty air space within which a tubular particulate filter that has radially inner and radially outer faces is disposed such that an imaginary centerline of the filter is generally horizontal and the radially inner face circumferentially surrounds a clean air space;
a dirty air inlet for delivering dirty air into the dirty air space of the air box;
a clean air outlet for delivering clean air from the clean air space;
a throttle body assembly comprising an inlet into which clean air from the clean air outlet enters and an outlet from which clean air exits;
a plenum comprising an inlet at which clean air from the throttle body assembly outlet enters a plenum space; and
runners that have respective inlets through which clean air from the plenum space enters and that have respective lengths running along respective center lines from the respective inlets to respective outlets for delivering clean air to respective cylinders of an engine; and
in which each respective imaginary vertical plane that passes through a respective runner centerline at the respective runner outlet intersects the centerline of the tubular filter at a vertical elevation below that of the respective runner centerline at the respective runner outlet.

8. An engine air intake module as set forth in claim 7 in which the centerline of the tubular filter is disposed throughout its entire length at a vertical elevation below the elevations of the runner centerlines at the runner outlets.

9. An engine air intake module as set forth in claim 7 in which the centerline of the tubular filter is disposed throughout its entire length at a vertical elevation below the entirety of every runner outlet.

10. An engine air intake module as set forth in claim 7 in which the air box comprises a cover that closes an opening through which the filter can be accessed when the cover is removed from closing the opening.

11. An engine air intake module as set forth in claim 7 in which the walled air box comprises an interior wall surface and an exterior wall surface, and at least a portion of the length of each runner is disposed on the exterior wall surface of the walled air box.

12. An engine air intake module as set forth in claim 7 in which the plenum is disposed in vertically underlying relation to the dirty air space, the clean air space continues from the filter along a passage that comprises a reverse bend to the throttle body assembly inlet, and the throttle body assembly is disposed at a lengthwise end of the plenum so that clean air passes from the reverse bend, through the throttle body assembly, to the plenum inlet in a generally horizontal direction.

13. An engine air intake module comprising:
an air box comprising first and second walled parts enclosing an interior that contains a particulate filter through which air flow through the air box is constrained to pass, thereby separating a clean air space from a dirty air space;
the first and second walled parts comprising respective closed perimeters which bound respective openings of the respective parts and form a joint at which the parts fit together;
one of the parts comprising a divider wall that divides an interior volume of the one part into a portion of one of the air spaces and a portion of the other of the air spaces, including dividing the opening of the one part into two respective open areas each bounded by its own closed perimeter;
the other part comprising and interior volume and a divider that divides the opening of the other part into two respective open areas each bounded by its own closed perimeter;
an element captured between the first and second walled parts comprising a closed perimeter frame captured between the closed perimeter frames of the parts to make the joint between the parts air-tight;
the element comprising a divider that divides the frame into two respective open areas each bounded by its own closed perimeter and that is captured between the divider of the other part and the divider wall of the one part such that a first of the open areas of the one part, of the other part, and of the element are disposed in mutual registration, and a second of the open areas of the one part, of the other part, and of the element are disposed in mutual registration, with the closed perimeter bounding the first open area of the element being captured between the closed perimeter frames bounding the first open areas of the first and second parts to make an air-tight joint between them, and with the closed perimeter bounding the second open area of the element being captured between the closed perimeter frames bounding the second open areas of the first and second parts to make an air-tight joint between them;
and one of the open areas of the element containing the particulate filter.

14. An engine air intake module as set forth in claim 13 in which the interior volume of the other part is clean air space.

15. An engine air intake module as set forth in claim 13 in which the first open areas of the one part, of the other part, and of the element are substantially congruent rectangles, the second open areas of the one part, of the other part, and of the element are substantially congruent rectangles, the substantially congruent rectangles of the first open areas are larger in area than those of the second open areas, and the particulate filter is contained in the first open area of the element.

16. An engine air intake module as set forth in claim 13 in which the first open areas of the one part, of the other part, and of the element are substantially congruent, the second open areas of the one part, of the other part, and of the element are substantially congruent, the substantially congruent first open areas are larger in area than the substantially congruent second open areas, and the element is substantially planar and disposed in a plane that is both non-parallel and non-perpendicular to a length of the module that is parallel to a centerline of an engine when the module is mounted on an engine.

17. An engine air intake module as set forth in claim 13 in which the other open area of the element is unoccupied.

\* \* \* \* \*